Jan. 17, 1956
L. E. PURMORT
2,731,157
FILTER
Filed Jan. 15, 1954
FIG. 1.
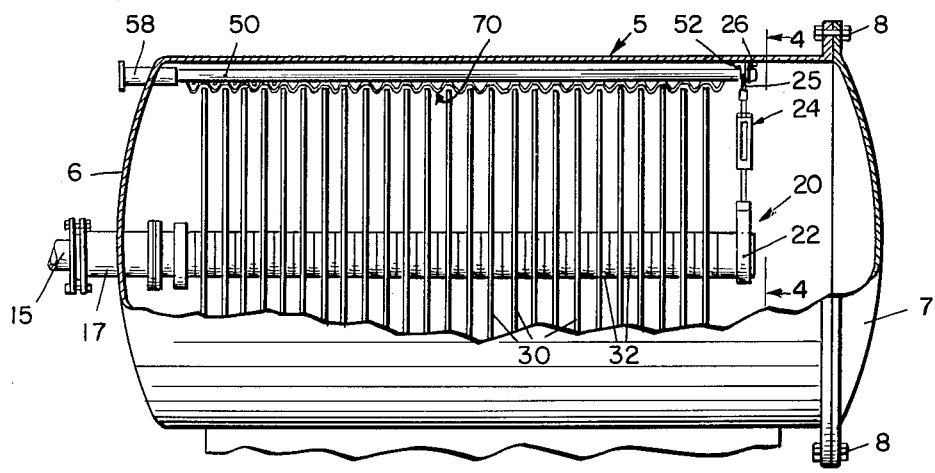
FIG. 2.
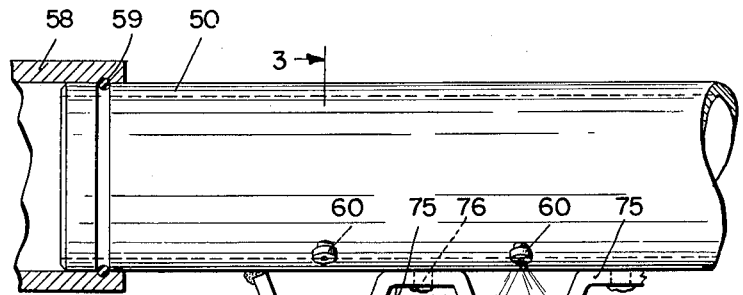
FIG. 4.
FIG. 3.
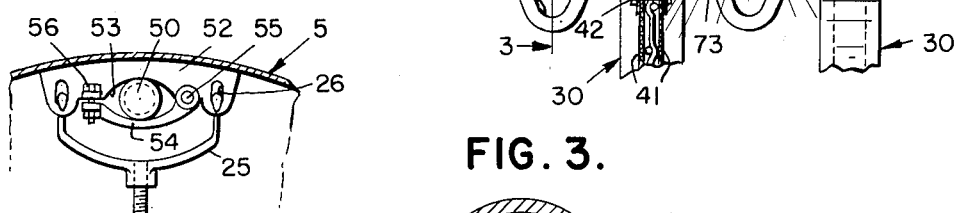
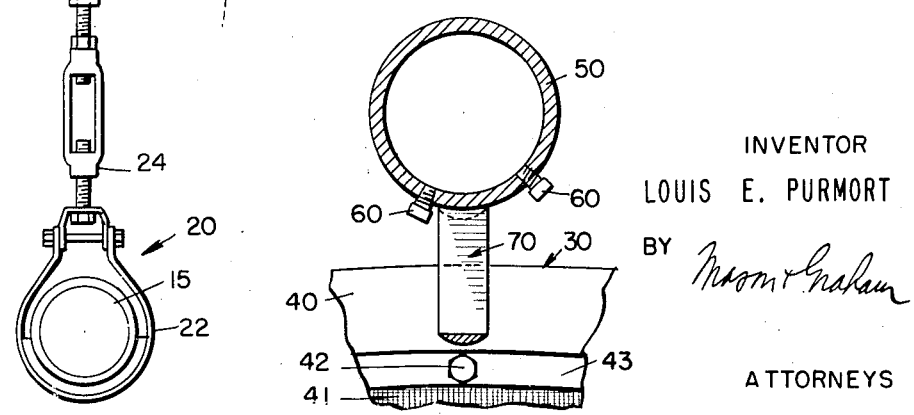
INVENTOR
LOUIS E. PURMORT
BY Mason & Graham
ATTORNEYS United States Patent Office 2,731,157
Patented Jan. 17, 1956

2,731,157
FILTER

Louis E. Purmort, Lynwood, Calif.

Application January 15, 1954, Serial No. 404,229

4 Claims. (Cl. 210—200)

My present invention has to do with improvements in filters.

More particularly, my invention relates to improvements in that type of filter device wherein a plurality of filter leaves are fixed on a tubular shaft rotatably mounted in a tank or drum. Before starting the filtering operation, the filter leaves are precoated with a filtering media. To accomplish this, a filtering media such as finely divided asbestos or diatomaceous earth or activated carbon, or colloidal clays, is introduced into the tank in suspension in a liquid medium. This liquid medium enters the screens of the filter leaves, thence passes out through the tubular shaft. The filter leaf screens prevent the filtering media particles from entering the filter leaves so that the filtering media becomes deposited on the screens as a filtering precoat, thus enhancing the filtering capabilities of the filter screens. In some cases, this filtering media may be introduced into the drum by mixing it with the liquid to be filtered.

When a filtering operation is completed, the screens must be cleaned, and the filtering media which has become deposited on the screens must be removed. To clean the screens and remove the collected filtering media, the shaft upon which the filter leaves are fixed is rotated relative to spray jets from which a liquid cleaning agent is projected onto the screens of the filter leaves. The filtering media is thus washed from the screens, falls to the bottom of the drum and is then withdrawn for reuse.

A difficulty which has long been experienced with such filter devices is that the filter leaves, which comprise relatively fine mesh screens carried by a relatively light framework, become warped and deformed and thus get out of proper position to receive the full effect of the spray jets.

It is an object of my invention to overcome this shortcoming of prior filter devices of this type by providing a combination structure wherein a filter leaf alignment guide is provided and so mounted in relation to the filter leaves as positively to maintain the filter leaves in predetermined relationship to the spray jets.

It is also an object of my invention to provide in such a device a filter leaf alignment guide so mounted as to be quickly swung out of its normal operative position so as to permit the filter leaves to be removed axially from the drum.

Other objects and advantages will appear hereinafter.

Without intending thereby to limit the broader scope of my invention, except as may appear from the appended claims, but rather for the purpose of rendering my invention understandable by those skilled in the art, I shall now describe a presently preferred embodiment thereof, for which purpose I shall refer to the accompanying drawings, wherein Fig. 1 is a side view, partly in elevation and partly in longitudinal section, showing a filter device embodying my invention;

Fig. 2 is an enlarged fragmentary elevation showing my filter leaf alignment guide and its relation to the manifold and filter leaves;

Figure 3 is a section taken on line 3—3 of Fig. 2; and Fig. 4 is a view taken on line 4—4 of Fig. 1.

Referring now to the drawings, the numeral 5 denotes a horizontal cylindrical drum or tank having an integral inner end wall 6 and a removable outer end wall 7, the latter being secured to the open outer end of the drum in conventional manner, as by bolts 8.

A tubular shaft 15 is rotatably mounted axially in the drum, being journaled at the inner end of the drum in bearing 17 and journaled at its outer end in a hanger 20 suspended from the top of the drum. This hanger comprises a band 22 disposed about the shaft 15 to provide a bearing therefor, the band being carried by a jack screw member 24 having a hook 25 engaging in holes 26 provided in bracket 52 secured to the top of the drum.

A plurality of filter leaves 30 are secured to the shaft 15, each filter leaf having a hub portion 32 keyed to the shaft 15. The particular construction of the filter leaves is of relatively little importance insofar as my present invention is concerned, the screen here shown having a frame 40 carrying on each side one or more screens 41, the screens being held on the frame as by means of retaining rings 43 and bolts or rivets 42. The screens are spaced apart by the frame so that fluid entering through the screens may pass through the space between the screens and into the hollow shaft 15 through registering openings (not shown) in the hub and shaft. A particular screen construction is shown in my co-pending application, Serial No. 425,353, filed April 26, 1954. The shaft 15 is arranged to be rotated by a suitable drive mechanism (not shown) mounted exteriorly of the drum. The drum also has an inlet opening (not shown) through which liquid to be filtered might be introduced.

For introducing a cleaning fluid into the drum to be sprayed against the screens of the filter leaves to clean them, I provide a manifold or header 50. This manifold is mounted at its outer end in a bracket 52 depending from the top portion of the drum, the manifold fitting in an elliptical recess 53 in the bracket. A clamping arm 54 is pivoted at 55 to the bracket and secured to the bracket at its other end by bolt 56. At its other end, the manifold has a rotatable but fluidtight fit in a sleeve 58 mounted in an opening in the inner end of the drum and adapted to be placed in communication with a supply of cleaning liquid under pressure, a fluidtight seal being maintained between the header 50 and sleeve 58 by an O-ring 59.

Between each pair of contiguous filter leaves the manifold has a plurality of radially disposed spray nipples 60, each being disposed to project a dual or double jet of cleaning liquid angularly onto the outer surfaces of a pair of contiguous filter leaves as shown in Fig. 2.

In use, the plane of the filter leaf may be maintained in a predetermined relationship to the spray jets by the provision of the leaf alignment guide 70 now to be described.

This leaf alignment guide 70 comprises a substantially rigid bar of metal or other suitable material formed into a somewhat sinuous shape to provide alternate V portions 72 and U portions 73, the respective filter leaves 30 being so disposed as to have their peripheral portions disposed in the centers of the U portions while the spray nipples are disposed about the centers of the V portion.

It is my preference to secure the member 70 to the manifold 50 as by plug welds 76 securing the web portions 75 to the manifold. Of course conventional screws could be substituted for the welds.

In operation, when it is desired to clean the filter leaves, the shaft 15 is rotated while the desired cleaning liquid is introduced into the manifold 50 and sprayed onto the filter leaves through the spray jets 60. Even though the filter leaves may be warped or deformed so that they tend to rotate out of plane, the limit to which they can rotate out of plane is determined by the alignment guide 70.

When it is desired to remove the filter leaves from the drum for overhaul or replacement, the alignment guide 70 may be swung out of the path of axial movement of the filter leaves by releasing bolt 56 to free the manifold for rotation, then rotating the manifold 90°, in which position the guide 70 will be out of the path of axial movement of the leaves so that they may be removed axially of the shaft after removing the end wall 7 of the drum.

I claim:

1. In a filter, the combination of a tank, a shaft mounted in the tank and disposed axially thereof, filter leaves mounted on and disposed radially of said shaft in parallel relationship and spaced apart longitudinally of the tank, a rotatable member disposed longitudinally of the tank adjacent the peripheral portions of said leaves, abutment elements carried by said member and presenting abutment portions normally projecting between said leaves, and liquid spray means positioned in said tank to project liquid sprays against the side surfaces of said leaves; said rotatable member being mounted for rotation about its longitudinal axis relative to said tank and said leaves whereby, in response to rotation thereof, to move said abutment portions from between said leaves.

2. The combination of claim 1 wherein said abutment elements comprise an elongated sinuous strip secured at longitudinally spaced points to said rotatable member, and wherein said abutment portions comprise V-shaped portions of said strip.

3. In a filter, the combination of a cylindrical tank, a tubular shaft rotatably mounted in the tank and disposed axially thereof, radially disposed filter leaves mounted on and in communication with said shaft in spaced parallel relationship, a header rotatably mounted in and longitudinally of the tank adjacent but spaced from the peripheries of said leaves, said header being adapted to carry a cleaning liquid under pressure, spray jets carried by and communicating with said header and disposed between the planes of said leaves to spray liquid from said header in angular directions onto the side faces of said leaves, and abutment means for maintaining the peripheral portions of said leaves in substantially parallel relationship radial to said shaft, said abutment means comprising an elongated substantially rigid sinuous bar secured to said header and having V-shaped portions extending between said leaves, the width of said bar being such that when said header is rotated about 90° said V-shaped portions of said bar will be removed from between said leaves.

4. In a filter, the combination of a tank, filter leaves in the tank, means mounting said filter leaves in spaced parallel relationship, a header mounted in the tank adjacent the peripheral portions of said leaves, said header being adapted to carry a cleaning liquid under pressure, spray means carried by said header between the planes of said leaves in position to spray said liquid from said header onto the side faces of said leaves, and abutment means carried by said header normally extending between said leaves, said header being adjustably rotatable to position said abutment means beyond the peripheral portions of said leaves.

References Cited in the file of this patent

UNITED STATES PATENTS

| 1,259,139 | Salisbury | Mar. 12, 1918 |
| 1,432,134 | Sweetland | Oct. 17, 1922 |
| 2,073,026 | Renfrew et al. | Mar. 9, 1937 |

FOREIGN PATENTS

| 564,913 | France | Oct. 31, 1923 |